United States Patent Office 3,052,673
Patented Sept. 4, 1962

3,052,673
PROCESS FOR THE PRODUCTION OF 2-(BENZENE-SULFONAMIDO)-OXAZOLES
Viktor Wolf, Hamburg-Hochkamp, and Werner Loop, Hamburg-Lockstedt, Germany, assignors to Nordmark-Werke G.m.b.H., Hamburg, Germany
No Drawing. Filed Jan. 13, 1961, Ser. No. 82,391
Claims priority, application Germany Feb. 1, 1960
3 Claims. (Cl. 260—239.9)

Our invention relates to a process for the production of 2-(benzenesulphonyl)-amino-oxazoles, preferably 2-(p-aminobenzenesulphonyl)-amino-oxazoles and 2-(p-acyl-amino-benzenesulphonyl)-amino-oxazoles. These products are valuable therapeutic agents or intermediate products for the production of such agents. For instance the 2-(p-aminobenzenesulphonyl)-amino - 4.5 - dimethyl-oxazole is a well known bacteriostatic agent and the 2-(p-acylaminobenzenesulphonyl) - amino - 4.5 - dimethyl-oxazoles are valuable intermediate products for preparing the said 2-(p - amino - benzenesulphonyl)-amino-4.5-dimethyl-oxazole.

It is the aim of our invention to render it possible to produce the compounds mentioned before in a technically and economically better way than it was possible before.

We have found that 2-(benzenesulphonyl)-amino-oxazoles can be obtained in a technically simple manner and with surprisingly good yields by reacting a cyanamide derivative in which one hydrogen atom of the $NH_2$-group is replaced by a benzenesulphonyl radical in an acid medium with an α-keto-acylester of the general Formula I

wherein one R represents a member of the group consisting of the alkyl radicals, the hydroxyalkyl radicals, the benzyl radical and the phenyl radical, the other R stands for a member of the group consisting of hydrogen, the alkyl radicals, the hydroxyalkyl radicals, the benzyl radical and the phenyl radical and X represents an acyl radical. In this way the products of the general Formula II are obtained

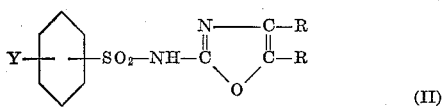

wherein the two R's have the same meaning as in Formula I and Y represents a member of the group consisting of hydrogen and the monovalent substituents such as the acylamino groups and the amino group.

According to a preferred embodiment of our invention we use as starting materials the α-keto-acylester of the general Formula III

wherein each of the two $R_1$'s represents a member of the group consisting of the alkyl radicals containing 1–3 carbon atoms, the benzyl radical and the phenyl radical and $X_1$ stands for the radical of a fatty acid containing 1–3 carbon atoms in its molecule.

In this way the products of the general Formula IV are obtained

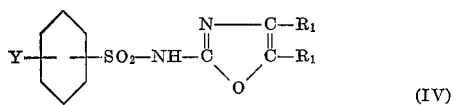

wherein the two $R_1$'s have the same meaning as in Formula III and Y has the same meaning as in Formula II.

As benzenesulphonyl radicals there are preferably used such benzenesulphonyl radicals which carry in the p-position to the sulpho group the amino group or a radical which can be converted into the amino group such as the acylamino groups.

The addition of acid to the reaction mixture can be varied within wide limits. For example it is possible to use that quantity of acid which corresponds stoichiometrically to the introduced metal salt of the cyanamide derivative, so that the free cyanamide derivative for example the p-acetyl-aminobenzenesulphonyl cyanamide is present with its specific acid pH value. However it is also possible to work with a considerable excess of acid so that for example a 6 N-acid corresponding to a substantially 20% hydrochloric acid is present at the end of the reaction. The conversion is expediently effected in a diluent; water as well as organic solvents miscible with water can be employed successfully as diluent. The reaction is carried out at medium temperatures, for instance between 0 and 100° C., but it is advisable to effect the reaction at 35–80° C. The molar ratio is preferably about 1:1, however the desired final products are also obtained when using one starting product in excess. Working up is effected by conventional methods.

The following examples illustrate the invention:

Example 1

10.7 g. (0.1 mol) of 3-chloro-2-butanone, 27.2 g. (0.2 mol) of crystallised sodium acetate and 100 cc. of ethanol are boiled for 14 hours under reflux, sodium chloride being precipitated. The ethanol is thereafter distilled off at normal pressure and the distillation residue is dissolved with a solution of 25.8 g. (0.05 mol) of the calcium salt of p-acetyl-amino-benzene-sulphonyl-cyanamide in 100 cc. of water. Concentrated hydrochloric acid is added to the solution until the Congo red reaction is slightly acid, whereupon another 60 cc. of concentrated hydrochloric acid are added and the mixture is heated for 2 hours at 60° C. After neutralisation, a crystal mass permeated with syrup is obtained, and after alkaline hydrolysis thereof and neutralisation of the hydrolysis solution, the 2-(p-amino-benzene-sulphonyl)-amino-4.5-dimethyl-oxazole is obtained as practically colourless crystals. After recrystallisation from hot water with use of active carbon, colourless crystals with the melting point 196–198° C. are obtained.

Example 2

13.9 g. of acetoin acetate are dissolved in a solution of 25.8 g. of the calcium salt of p-acetyl-amino-benzene-sulphonyl-cyanamide in 100 cc. of water. The solution is treated with hydrochloric acid until the Congo red reaction is slightly acid, the solution is then heated to 60° C. and another 40 cc. of 36% hydrochloric acid are added. A rise in temperature is observed and after a short time the 2-(p-acetaminobenzene-sulphonyl)-amino-4.5-dimethyl-oxazole starts to crystallise out. The temperature is kept for 1 hour at 60° C., it is filtered while warm and then washed with warm water. The almost colourless product which is obtained melts between 230 and 235° C. After alkaline hydrolysis, the 2 - (p - aminobenzene-sulphonyl) - amino - 4.5 - dimethyl oxazole is obtained therefrom, this substance melting between 197 and 199° C. after being recrystallised from boiling water.

Example 3

41.2 g. (0.2 mol) of 4-phenyl-3-acet-oxybutanone-(2) are dissolved in 280 cc. of ethanol in a three-necked flask provided with a stirrer, reflux condenser and thermometer and mixed with a warm solution of 51.6 g. (0.1 mol) of the calcium salt of p-acetylaminobenzene-sulphonyl-cyanamide in 210 cc. of boiling water. The reaction mixture is cooled down to 40° C. 70 cc. of concentrated hydrochloric acid are added while stirring whereby a strong exothermic reaction is initiated. The temperature is kept between 40 and 50° C. by cooling if necessary. After the termination of the exothermic reaction the reaction mixture is stirred for 2 hours at room temperature, then the ethanol is distilled off in vacuo, whereupon a greasy substance precipitates. The said substance is separated from the mother lye and thoroughly shaken with 300 cc. of 10% soda lye and 300 cc. of benzene. During this procedure the substance dissolves. The aqueous layer is separated, washed with benzene, subjected to a short vacuum distillation in order to remove the last parts of benzene, diluted with an equal volume of water, treated with active carbon and filtered. The filtrate is neutralised while stirring. The precipitate is sucked off, washed with water, dispersed in 800 cc. of water and dissolved therein by adding 10% soda lye. The solution is treated with active carbon and the filtrate is neutralised whereby the 2-(p-acetylaminobenzenesulphonyl) - amino - 4 - methyl-5-benzyl-oxazole is precipitated in crystalline form melting unsharply between 85 and 103° C. with evolution of gas.

In order to split off the acetyl group, 34 g. of the acetyl product and 210 cc. of 10% soda lye are heated to boiling under reflux for 45 minutes. The reaction mixture is diluted with 420 cc. of water. The hot solution is brought to a pH of 10 with an acid, treated with 1 g. of active carbon while being hot and filtered off. A small amount of dithionit is added to the filtrate, which is then cooled down and neutralised. The precipitate is sucked off, washed with water and for purification dissolved in a boiling mixture of 29 g. of triethanolamine and 100 cc. of water. On cooling the triethanolamine salt of 2 - (p - amino - benzenesulphonyl) - amino - 4 - methyl-5-benzyl-oxazole separates in the form of colourless crystals. These are sucked off and washed with ice-cold 10% solution of triethanolamine. The still moist triethanolamine salt is dissolved in 500 cc. of hot water to which a small amount of soda lye is added. The solution is treated with active carbon, filtered off and neutralised, whereupon the 2-(p-aminobenzenesulphonyl)-amino-4-methyl-5-benzyl-oxazole separates in the form of colourless crystals melting at 183–187° C.

A further purification can be effected by recrystallisation from boiling ethanol. The product thus obtained melts at 186–187° C.

The 4-phenyl-3-acetoxy-butanone-(2) can be prepared as follows:

124 g. aniline are diazotised in 1200 cc. of 20% hydrochloric acid with 84 g. of sodium nitrite in 200 cc. of water. Thereafter 25% soda lye (approximately 640 cc.) is added while cooling well and stirring until pH 3 is obtained. The solution is treated with active carbon in order to render it clear.

To the solution of the diazonium salt a solution of 40 g. of crystalline copper chloride (CuCl$_2$.2H$_2$O) in 200 cc. of water is added. Into the mixture a solution of 98 g. of methyl-vinyl-ketone in 1200 cc. of acetone is introduced dropwise while stirring and cooling with ice to a temperature of 8–10° C. After the addition of the ketone is completed, the mixture is stirred 10 hours without cooling with ice. Then the development of nitrogen terminates. The acetone is distilled off. The aqueous phase is extracted with methylene chloride. The methylene chloride solution is dried with magnesium sulphate. The methylene chloride is distilled off. The residue is distilled in vacuo. The 4-phenyl-3-chlorobutanone-(2) boils between 55 and 65° C. at a pressure of 0.2 mm.

164.7 g. of 4-phenyl-3-chlorobutanone-(2) are boiled 24 hours under reflux while stirring with 146 g. of crystallised sodium acetate (Na-acetate+3H$_2$O) and 900 cc. of 99% ethanol. The precipitated sodium chloride is sucked off. The ethanol is distilled off in vacuo. The residue is extracted with benzene. The benzene solution is filtered in order to separate it from the salt residue and is washed with water to which a small amount of diluted soda lye has been added in order to render it alkaline. The benzene solution is then dried with magnesium sulphate. The benzene is distilled off in vacuo. The 4-phenyl-3-acetoxy-butanone-(2) distills between 70 and 80° C. at a pressure of 0.2 mm.

What we claim is:

1. A process for preparing 2-benzenesulfonamido oxazoles of the formula

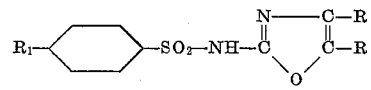

wherein one R is a member selected from the group consisting of alkyl with 1 to 3 carbon atoms, benzyl and phenyl, the other R is a member selected from the group consisting of hydrogen, alkyl with 1 to 3 carbon atoms, benzyl and phenyl and R$_1$ is a member selected from the group consisting of the amino and acyl amino groups which comprises heating a benzenesulfonylcyanamide of the formula

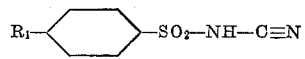

wherein R$_1$ is the same as above, with a compound of the general formula

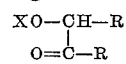

wherein R is the same as above and X is an acyl radical of a lower fatty acid at a temperature below 100° C. while maintaining an acid pH-value in the reaction mixture and isolating the 2-benzenesulfonamido oxazole thus obtained.

2. A process as claimed in claim 1 wherein the reaction is carried out in the presence of a reaction medium selected from the group consisting of water, the lower alkanols, acetone and mixtures thereof.

3. A process as claimed in claim 1 wherein the lower fatty acid ester of acetoin is reacted.

References Cited in the file of this patent
UNITED STATES PATENTS 2,494,524   Sprague   Jan. 10, 1950
2,809,966   Loop et al.   Oct. 15, 1957

OTHER REFERENCES

Backer et al.: "Rec. Trav. Chim.," vol. 61, pages 463–6 (1942).